United States Patent
Morgen et al.

[11] Patent Number: 5,878,491
[45] Date of Patent: Mar. 9, 1999

[54] PROCESS FOR THE MANUFACTURE OF A FORGED CONNECTING ROD

[75] Inventors: Paul Morgen, St Julien les Metz; Jean-Claude Pecourt, Hautes Rivieres; Marc Robelet, Florange, all of France

[73] Assignees: Ascoforge Safe, Hagondange; Ascometal, Puteaux, both of France

[21] Appl. No.: 825,572

[22] Filed: Mar. 31, 1997

[30] Foreign Application Priority Data

Mar. 29, 1996 [FR] France .................................... 96 03941

[51] Int. Cl.⁶ ....................................................... B23P 15/00
[52] U.S. Cl. ................................ 29/888.091; 29/888.09; 29/889.091
[58] Field of Search ........................... 29/888.09; 72/416, 72/356

[56] References Cited

U.S. PATENT DOCUMENTS

| | | | |
|---|---|---|---|
| 2,080,640 | 5/1937 | Templin | 29/888.09 |
| 4,993,134 | 2/1991 | Hoag et al. | 29/888.09 |
| 5,016,807 | 5/1991 | Haack | 29/888.09 |
| 5,105,538 | 4/1992 | Hoag et al. | 29/888.09 |
| 5,109,605 | 5/1992 | Hoag et al. | 29/888.09 |
| 5,131,577 | 7/1992 | Hoag et al. | 29/888.09 |
| 5,402,663 | 4/1995 | Rit et al. | |
| 5,507,093 | 4/1996 | Wittenstein et al. | 29/888.09 |
| 5,544,413 | 8/1996 | Stevens et al. | 72/356 |
| 5,592,847 | 1/1997 | Sarkisian et al. | 72/356 |
| 5,664,327 | 9/1997 | Swars | 29/888.09 |

FOREIGN PATENT DOCUMENTS

| | | |
|---|---|---|
| 0 572 246 | 12/1993 | European Pat. Off. . |
| 0 696 688 | 2/1996 | European Pat. Off. . |
| 43 29 371 | 3/1995 | Germany . |
| 59-215236 | 12/1984 | Japan . |
| 60-247432 | 12/1985 | Japan . |
| 64-18544 | 1/1989 | Japan . |
| 0221232 | 9/1991 | Japan ..................................... 72/416 |
| 6-64741 | 3/1994 | Japan . |
| 0571341 | 9/1977 | U.S.S.R. ................................. 72/356 |
| 0576140 | 10/1977 | U.S.S.R. ................................. 72/356 |

*Primary Examiner*—I Cuda
*Attorney, Agent, or Firm*—Oblon, Spivak, McClelland, Maier & Neustadt, P.C.

[57] ABSTRACT

A process for manufacturing a forged connecting rod of the type including a big end, a shank and a small end. A connecting rod rough forging, free of lateral flash and including at least one bore initiator on the big end and on the small end, is manufactured by forging. The connecting rod rough forging is sized, content-wise, by plating the connecting rod rough forging between two inserts inside a die in order to obtain a sized connecting rod rough forging.

18 Claims, 5 Drawing Sheets

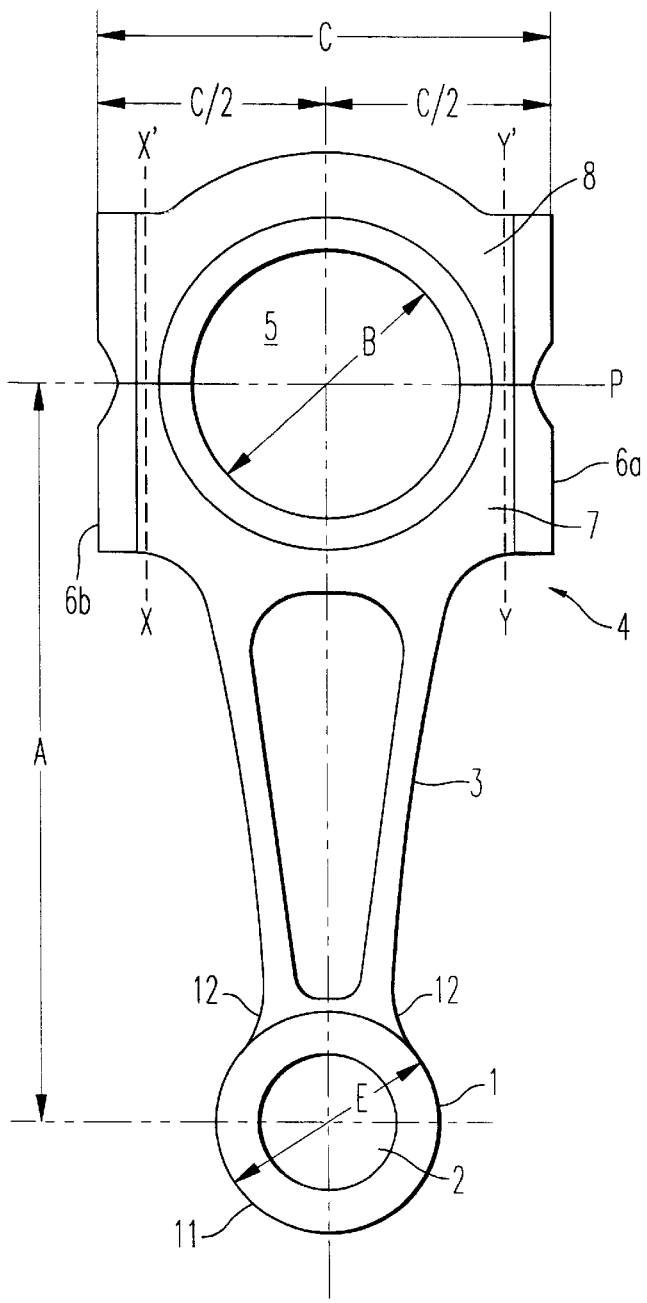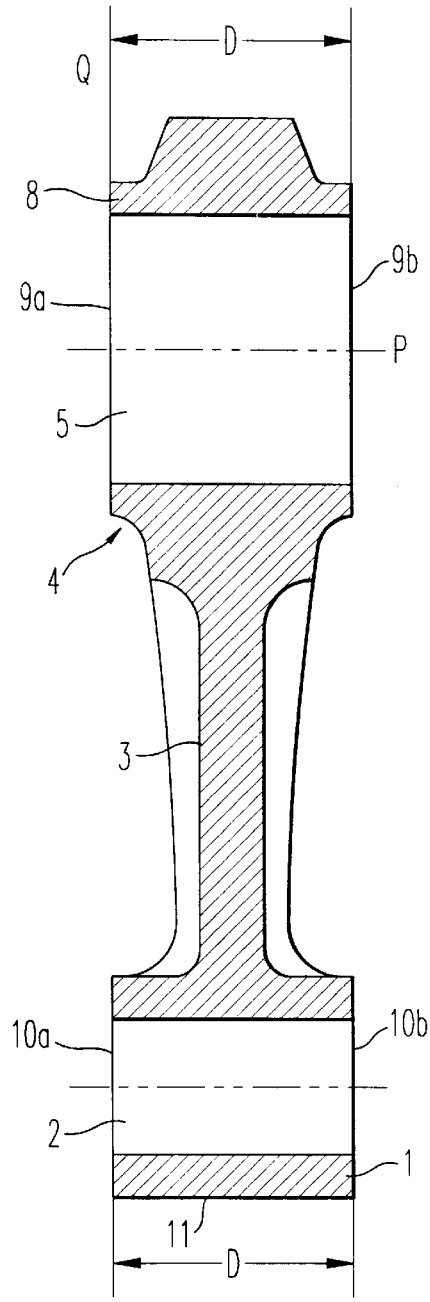
FIG. 1
FIG. 2

PROCESS FOR THE MANUFACTURE OF A FORGED CONNECTING ROD

BACKGROUND OF THE INVENTION

1. Field of the Invention

The present invention relates to the manufacture of a forged connecting rod, and especially of a forged connecting rod for an internal combustion engine.

2. Discussion of the Background

Forged connecting rods, in particular forged connecting rods for an internal combustion engine, especially when they are made of steel, are manufactured by a process which comprises hot forging of a connecting rod rough forging, a heat treatment and a machining operation.

The forging includes several steps which are, in general, the manufacture of a slug by the shaping rolling of a billet treated beforehand to a suitable temperature, the drop forging or closed-die forging of the slug, the cutting-off of the forging flash or its trimming, and a punching step.

The heat treatment, which may be carried out at a later stage or while the rough forging is still hot, depends especially on the grade of steel used and on the desired mechanical properties.

When it is carried out at a later stage, the heat treatment may be a normalization intended to obtain a pearlitic or ferrito-pearlitic structure. This is, in particular, the case when separable connecting rods are manufactured, that is to say when connecting rods are manufactured whose big end may be separated into two parts by brittle fracture. The heat treatment at a later stage may also be a hardening step followed by an annealing step, the hardening being intended to obtain a mainly martensitic structure whose mechanical properties are very high.

When the heat treatment is carried out while the forging is still hot, which assumes that the temperature at the end of the forging operation is high enough, it always includes a controlled cooling operation, either cooling sufficiently slowly to obtain a pearlitic or ferrito-pearlitic structure or sufficiently rapidly to obtain a mainly bainitic structure. When the desired structure is mainly bainitic, the controlled cooling may include a temperature hold intended to cause a substantially isothermal transformation. It may also include reheating to a temperature below approximately 600° C. in order to produce an annealing effect. The annealing may also be carried out at a later stage.

The machining operation mainly includes the trueing of the side faces and the machining of the bores in the big end and in the small end of the connecting rod, the separation of the big end into two parts and the drilling of holes intended to receive the fixing bolts for the two parts of the big end. The big end is separated into two parts either by machining or, when the big end is separable, by brittle fracture under an impact.

In order for the machining operation to be carried out under the proper precision conditions, it is necessary to premachine the reference surfaces at the periphery of the rough forging so as to suitably position it on the machining machines, and this operation is tricky.

Apart from the machining difficulties, this technique also has a drawback, in the case of mass production, of leading to too great a variation in the dimensions and in the weight of the connecting rods to be able to fit them into engines indiscriminately. When the weights of the connecting rods in the same engine vary too much, the engine is poorly balanced. Therefore, before fitting into engines, the connecting rods are sorted in order to group them into narrow weight classifications. These grouping operations require accurate weighing and complicate the manufacture.

In order to improve the geometrical precision of the connecting rod rough forgings, it has been proposed, in German Utility Model DE 43 29 371, to replace the closed-die forging of the slug with forging of the slug in a closed die, by plating between two inserts provided with impressions. The rough forging obtained includes a shank, a big end and a small end; the big end and the small end each include two bore initiators separated by a web. At the end of forging, the relative movement of the two inserts is stopped when the volume of the space delimited by the two inserts and by the die is equal to the volume of metal of the slug. The geometrical precision and the precision in the weight of the rough forging are then directly determined by the precision in the weight of the slug. In order to obtain a precision rough forging, it is necessary to use a precision slug which can only be obtained by machining, which operation is very expensive for the manufacture of a slug. In addition, the forging of the slug is carried out with large deformations of the metal, the deformation ratios are several tens of %, which lead to rapid wear of the inserts unfavorable to mass production.

SUMMARY OF THE INVENTION

An object of the present invention is to remedy the above drawbacks by providing a process for manufacturing forged connecting rods which makes it possible to obtain, in high volume, precision connecting rod rough forgings; that is to say which leads, in mass production, to both the dimensional precision and the weight precision to be sufficient for it to be necessary to neither premachine the reference surfaces nor to sort by weight classifications before fitting into an engine.

For this purpose, a feature of the invention relates to a process for manufacturing a forged connecting rod of the type comprising a big end, a shank and a small end, in which:

a connecting rod rough forging, free of lateral flash and including at least one bore initiator on the big end and on the small end, is manufactured by forging;

and the connecting rod rough forging is sized, content-wise, by plating the connecting rod rough forging between two inserts inside a die in order to obtain a sized connecting rod rough forging.

In order to obtain precise sizing, especially in terms of weight, the relative position of the two inserts at the end of sizing is determined independently of the volume of metal of the connecting rod rough forging, for example using a stop.

In order to be able to use connecting rod rough forgings, the weight of which is relatively variable, the assembly including the die and the two inserts comprises at least one means for receiving excess metal of the connecting rod rough forging without affecting the shape precision of the sized connecting rod rough forging. The means for receiving excess metal of the connecting rod rough forging may include at least one cavity placed either in the wall of the die, or in the impression in at least one insert, in a region which does not affect the geometrical precision of the sized connecting rod rough forging. The means for receiving excess metal of the connecting rod rough forging may also include at least one orifice placed in the wall of the die and opening to the outside.

The sizing operation may be limited to the external shape of the rough forging, or also concern the bore in the big end, and optionally the bore in the small end. In this case, a connecting rod rough forging is used from which at least the web of the big end, and possibly the web of the small end, has been removed beforehand.

In order to size the bore in the big end or in the small end, a mandrel, able to slide in holes made in the inserts and lying along the axis of the bore, is placed in the bore of the connecting rod rough forging and then the sizing is carried out.

Finally, the sized connecting rod rough forging may be subjected to a heat treatment, either while still hot from sizing, or at a later stage, before being machined.

Therefore, the present invention relates to a process for manufacturing a forged connecting rod comprising a first end, a shank and a second end. The process comprises the steps of forging a connecting rod rough forging free of lateral flash and including at least one bore initiator on the first end and on the second end; and sizing the connecting rod rough forging, content-wise, by plating the connecting rod rough forging between first and second inserts inside a die in order to obtain a sized connecting rod rough forging.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 represents a connecting rod, as seen from above;

FIG. 2 is a longitudinal sectional view of a connecting rod;

DESCRIPTION OF THE PREFERRED EMBODIMENTS

Figure 3:
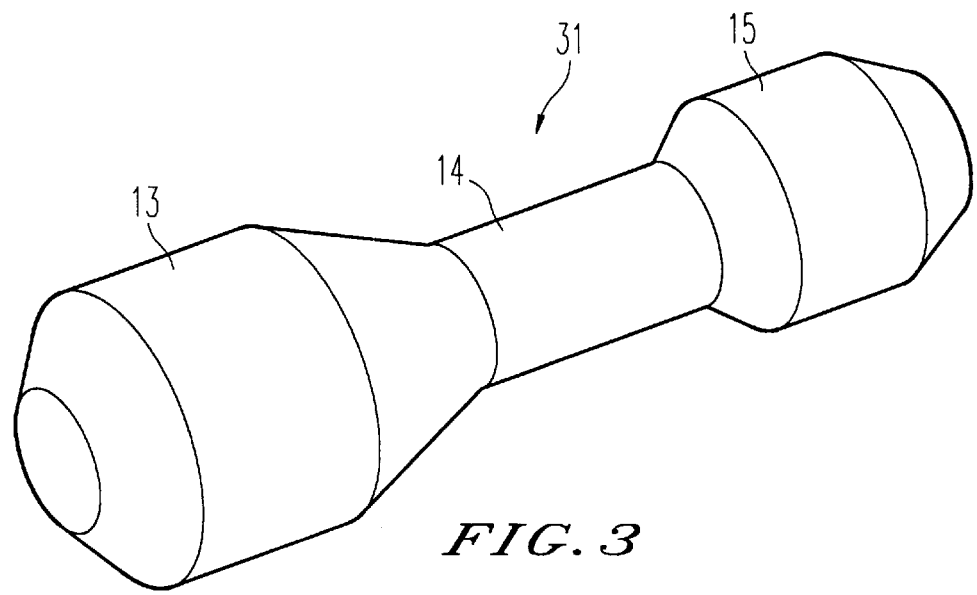
FIG. 3 represents a slug obtained by shaping rolling.

Before describing the manufacturing process according to the invention, it will be specified what is meant by a precision sized connecting rod rough forging.

Referring now to the drawings, wherein like reference numerals designate identical or corresponding parts throughout the several views, the connecting rod, as shown in FIGS. 1 and 2, comprises a small first end 1 which includes a bore 2, a shank 3, and a big second end 4 which includes a bore 5 and two lugs 6a, 6b. The big end 4 includes a first part 7, made as one piece with the shank 3 and the small end 1, and a cap 8 which is separated from the part 7 along the plane P and fixed to the part 7 by bolts (not shown in the figure) which are placed in holes drilled along the axes XX' and YY' in the lugs 6a and 6b.

The precision of the connecting rod is defined, on the one hand, by a variation in the weight, which must be less than 0.7% for a precision connecting rod, and, on the other hand, by geometrical parameters which are, in particular:

the planarity, that is to say the fact that the side faces 9a, 9b of the big end 4 and the side faces 10a, 10b of the small end 1 are in the same plane;

the perpendicularity of the circumferential surface 11 to the side faces 10a and 10b of the small end;

the center-to-center distance A between the big end 4 and the small end 1;

the thickness D of the big end 4 and of the small end 1;

the width C of the big end 4;

the diameter B of the bore 5 in the big end 4;

the centering of the bore in the big end 4 with respect to the width of the big end 4;

the regularity of the circumferential surface 11 of the small end 1; and the shape of the regions 12 connecting the shank 3 to the small end 1.

The connecting rod is manufactured by machining, starting from a sized connecting rod rough forging whose shape is very close to that of the connecting rod shown in FIGS. 1 and 2. The sized connecting rod rough forging is distinguished from the finished connecting rod by the following characteristics:

whereas the connecting rod comprises two pieces, the sized connecting rod rough forging is made of a single piece, separation into two pieces taking place after machining,;

the active surfaces of the sized connecting rod rough forging are not machined and, sometimes, the bores in the big end and in the small end are not completely drilled; and the sized connecting rod rough forging has no holes for fixing the cap to the rest of the connecting rod.

However, these differences are secondary for understanding the rest of the text, and, in order to describe the machining, reference will be made to FIGS. 1 and 2.

Figure 9:
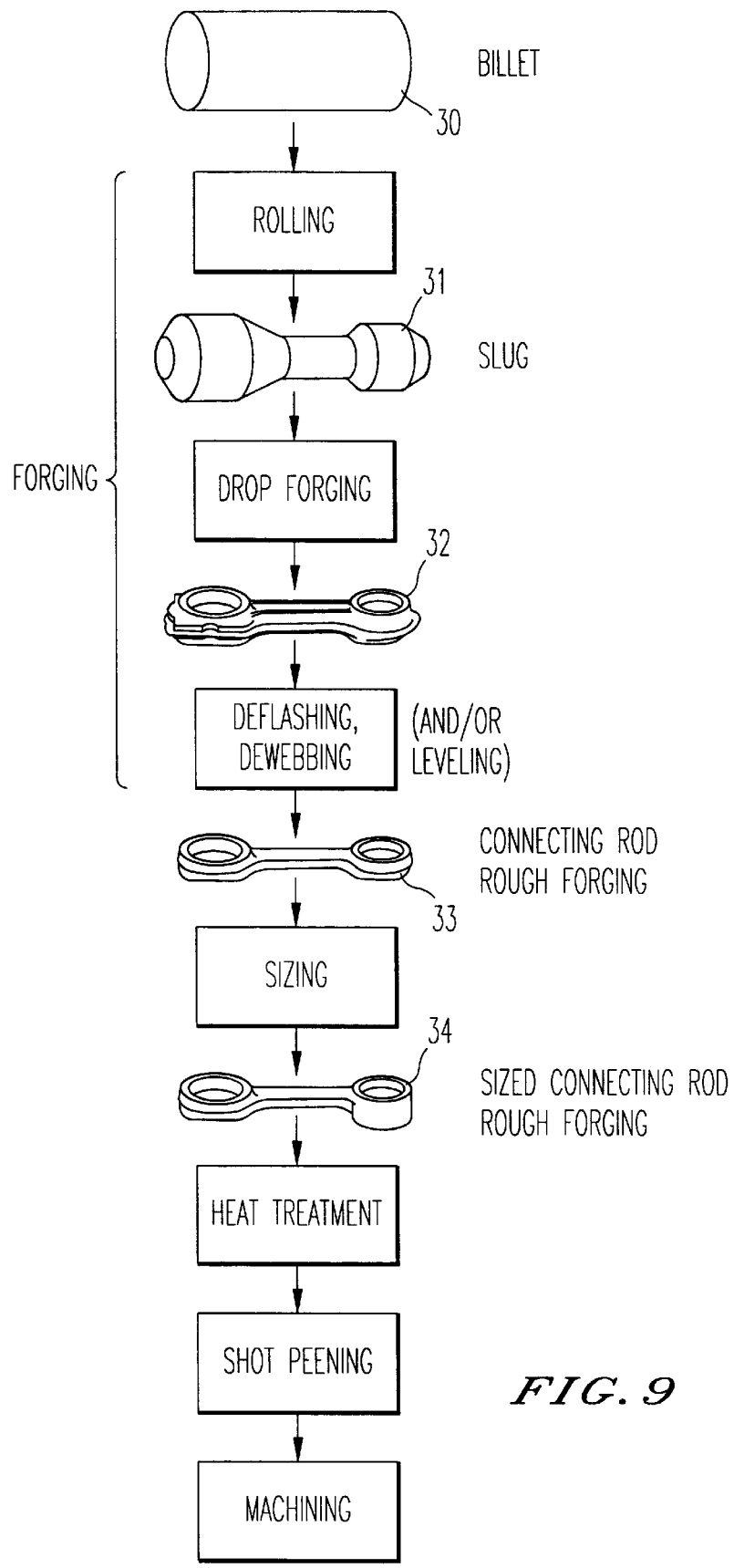
FIG. 9 is a diagram showing the main operations in the manufacture of a sized forged connecting rod.

The process for manufacturing a connecting rod, including the main steps shown in FIG. 9, will now be described in more detail.

A billet 30 is cut from a semi-finished product, which may be a slab or a round bar for example, by sawing or by cropping, either cold or hot.

After reheating, for example by induction, preferably in a controlled atmosphere in order to limit the formation of scale, at a temperature preferably above $AC_3$ and even better between 1050° C. and 1350° C., preshaping rolling of the billet 30 is carried out in order to obtain a slug 31 (FIG. 3) having, at one end, a massive part 13 intended to become the big end 4 of the connecting rod, at the center, a drawn part 14 which will become the shank 3 of the connecting rod and, at the other end, a part 15, less massive than the massive part 13, in which the small end 1 of the connecting rod will be formed. The preshaping rolling is carried out either by longitudinal rolling using a mill with rolls having preforms, or by transverse rolling. In order to improve the productivity, it is possible to manufacture simultaneously two slugs joined together by one of their ends, and then to separate them by sawing.

Figure 4:
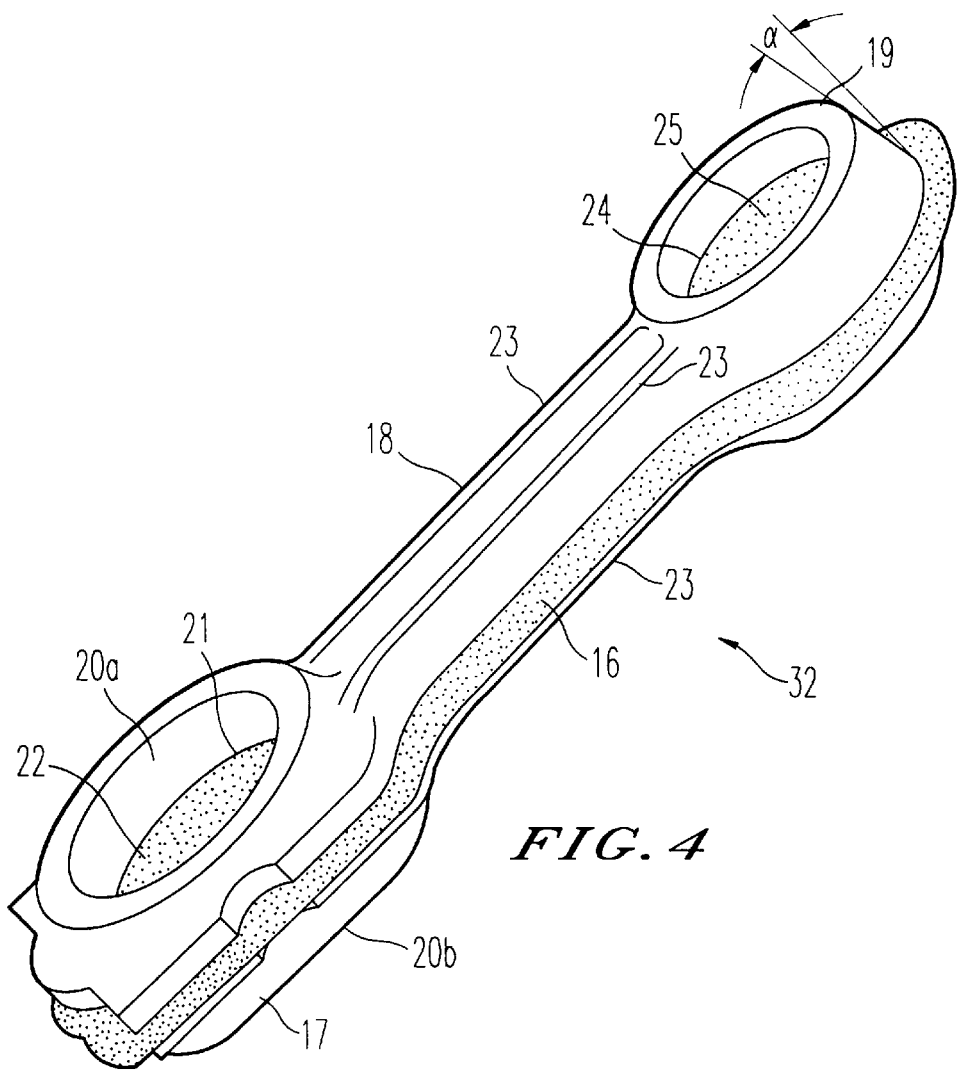
FIG. 4 is a perspective view of a connecting rod rough forging before deflashing and punching.
Figure 5:
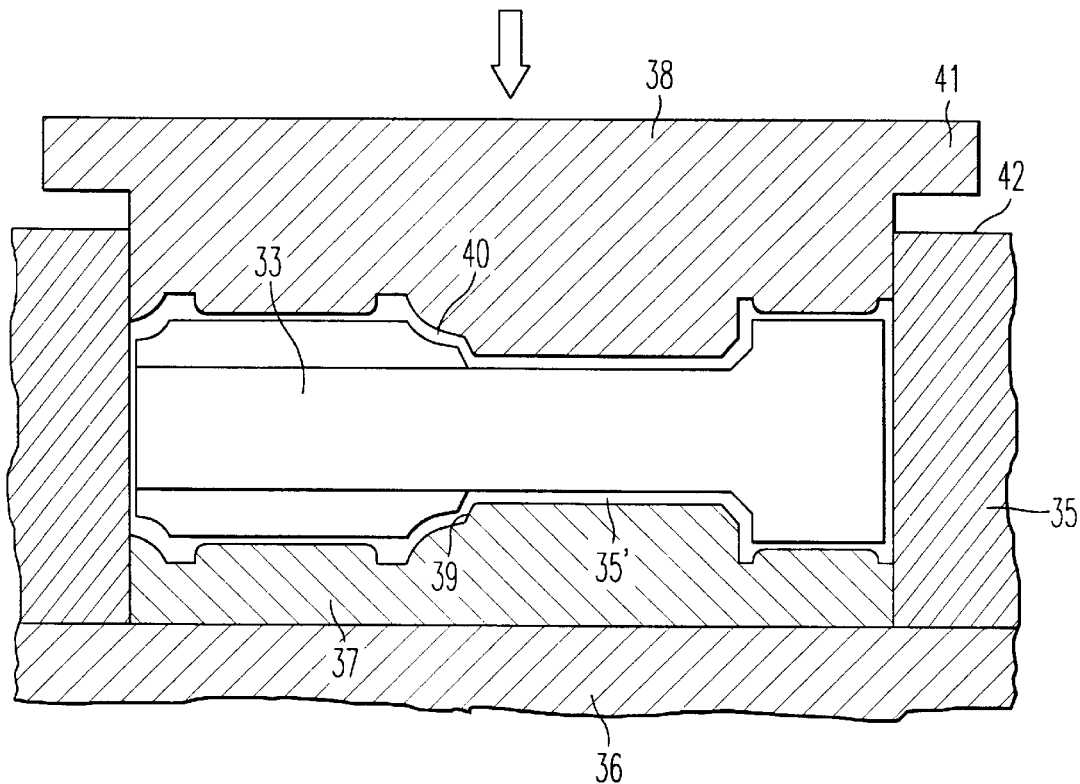
FIG. 5 is a sectional view of a content-wise sizing device containing a connecting rod rough forging.

The slug 31 is then forged, either by closed-die forging or by drop forging, in general in two or three successive impressions. In order to obtain a rough forging 32 (FIG. 4) having flash 16 at its periphery and comprising a big end 17, a shank 18 and a small end 19. On each of its side faces 20a, 20b, the big end 17 has a bore initiator 21 (only one is visible in the figure). The two bore initiators 21, arranged facing each other, are separated by a web 22. In general, the shank 18 has longitudinal ribs 23 and a web (not visible in the figure). The small end 19 has two bore initiators 24, facing each other, and separated by a web 25. The geometry of this rough forging is characterized, in particular, by drafts (for example the angle α shown in FIG. 4) of at least 3°.

The peripheral flash 16 of the rough forging 32 is removed by trimming and, optionally, the web 22, separating the bore initiators 21 of the big end 17, is removed by punching. The web 25, separating the bore initiators 24 of the small end 19, may also be removed by punching. A connecting rod rough forging 33 is thus obtained. These operations may, optionally, be supplemented by a levelling operation which makes it possible to remove all or part of the unnecessary drafts.

The connecting rod rough forging 33 is then sized, content-wise, in order to obtain a sized connecting rod rough forging 34 which is subjected to a heat treatment and then machined so as to obtain a precision connecting rod; that is to say a connecting rod whose external tolerances on the external geometry are less than 0.3 mm and on the weight, less than 0.7%. The content-wise sizing operation will be described in more detail later.

After sizing, and before machining, the sized connecting rod rough forging 34 may be subjected to a heat treatment followed, optionally, by shot peening. The shot peening serves, on the one hand, to remove the scale and on the other hand, to create compressive surface stresses.

In general, the connecting rods are made of carbon steel or of low-alloy steel, that is to say a steel containing less than 10% by weight of alloying elements. Depending on the applications, it is sought to confer on them a structure which is essentially pearlitic, or ferrito-pearlitic, or essentially bainitic, and the heat treatment is chosen depending, on the one hand, on the desired structure and, on the other hand, on the nature of the steel. A person skilled in the art knows how to make this choice.

The essentially pearlitic structures are obtained with steels containing approximately 0.6% to 0.75% of carbon. They have the advantage of enabling separable connecting rods to be obtained. The heat treatment includes a controlled cooling, at a rate of less than 10° C./s, from a temperature at which the steel has an austenitic structure.

Ferrito-pearlitic structures are obtained under the same conditions as above, but using a steel containing less than 0.4% of carbon. It is also possible to obtain separable connecting rods especially by adding from 0.04 to 0.2% by weight of phosphorus to the steel.

Bainitic structures are obtained by a controlled cooling, at a rate of greater than or equal to 0.5° C./s in order to obtain at least 60% of bainite, from a temperature at which the steel has an austenitic structure. This cooling may include a temperature hold in an intermediate temperature region so as to carry out a substantially isothermal transformation in order to obtain a lower bainite. The controlled cooling may be supplemented either by reheating to a temperature below 600° C. at the end of cooling, or by annealing after returning to room temperature. The steels used are, in general, either of the XC70 type or of the 45M5 or 38MSV5 type, and they may also contain an addition of from 0.04% to 0.2% by weight of phosphorus so as to obtain separable connecting rods.

With billet reheating temperatures above $AC_3$ and preferably at 1050° C., the steel is always austenitic during forging. If, at the end of content-wise sizing, the temperature is high enough, that is to say above the steel's $Ar_3$ point, the controlled cooling may be carried out directly while the rough forging is still hot from sizing. If this is not so, the heat treatment is carried out at a later stage, that is to say after the sized connecting rod rough forging has returned to room temperature. In this case, the heat treatment includes an austenizing operation prior to the controlled cooling and may, for example, be a normalizing operation.

After heat treatment and, optionally, shot peening, in order to remove the scale and to generate compressive surface stresses, the sized connecting rod rough forging is machined.

The machining includes, in particular, the trueing of the side faces 10a and 10b of the small end 1 and of the side faces 9a and 9b of the big end 4, the machining of the bores 2 and 5 in the small end 1 and in the big end 4, and the drilling and tapping of the holes intended to receive the bolts for fixing the cap.

Compared to the related art, the machining is lighter, on the one hand because the dimensions of the rough forging are close to the finished dimensions, and on the other hand because it is unnecessary to premachine the periphery of the rough forging, which premachining is absolutely necessary in the related art in order to position the rough forging on the machining machines appropriately.

After machining, the cap 8 is separated from the rest of the connecting rod by brittle fracture along the plane P.

The content-wise sizing operation includes placing the connecting rod rough forging 33, preferably after having coated it with a protective lubricant, in a recess 35' of a die 35 placed on a support block 36 of a press and, by operations of plating it between two inserts 37 and 38, each including an impression 39, 40, giving the rough forging 33 its final shape. The shape of the recess 35' in the die 35 corresponds exactly to the desired shape for the periphery of the sized connecting rod rough forging. The impressions 39 and 40 are, in hollow form, the desired shape for the side walls of the connecting rod. The upper insert 38 slides inside the recess 35' and includes, in its upper part, a platen 41 which, at the end of sizing, comes into abutment with the upper part 42 of the die 35 in such a way that the spacing between the two inserts 37, 38 corresponds exactly to the desired thickness for the sized connecting rod rough forging 34. Since the amount of metal (the weight and therefore the volume) of the connecting rod rough forging 33 is always slightly higher than that which is strictly necessary for producing the sized connecting rod rough forging 34, the assembly including the die 35 and the two inserts 37 and 38 comprises means for receiving the excess metal without affecting the shape precision of the sized connecting rod rough forging 34. Several embodiments are possible, distinguishing, for example, one embodiment in which the webs 22 and 25 separating the bore initiators 21, 24 of the big end 17 and of the small end 19 are not removed before sizing, and an embodiment in which at least the web 22 is removed and in which at least the bore 5 in the big end 4 is also sized, (if the web 25 of the small end 19 is removed, it is also possible to size the bore 2 in the small end 1).

Figure 6:
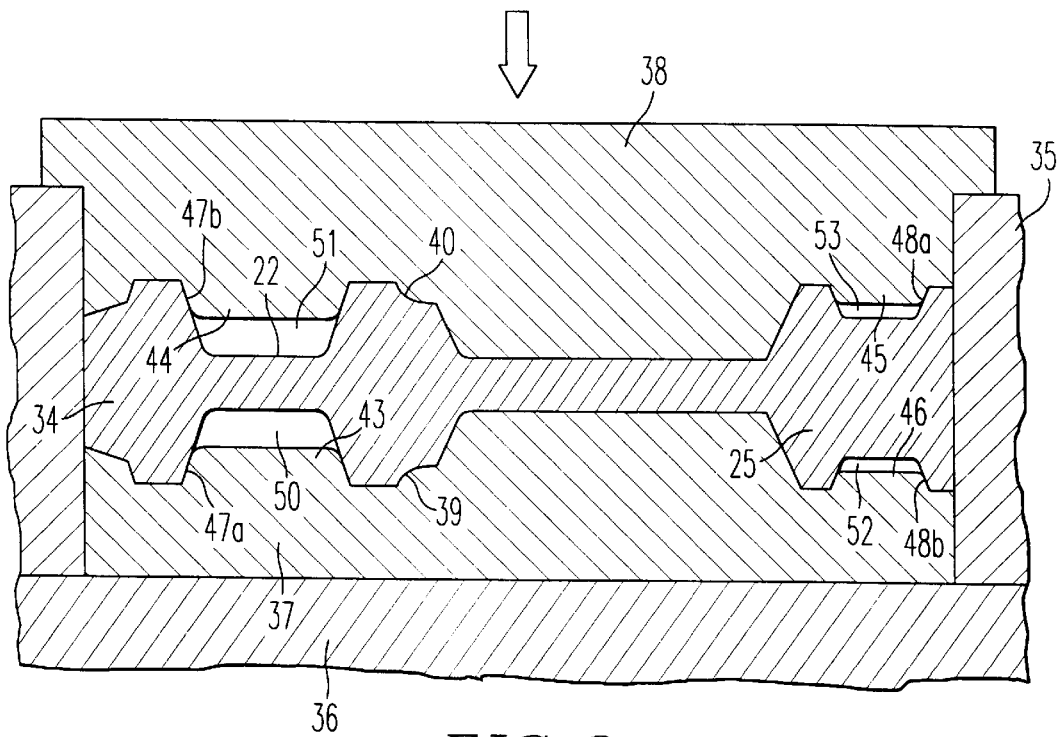
FIG. 6 is a sectional view of a content-wise sizing device, at the end of sizing, containing a sized connecting rod rough forging which has not been dewebbed.

In the first embodiment, illustrated in FIG. 6, the webs 22 and 25 of the rough forging 34 (in the figure, since the inserts 37 and 38 are shown clamped together, the rough forging 34 shown in cross-section is a sized connecting rod rough forging) are not removed. The impressions 39 and 40 in the inserts 37 and 38 include projections 43, 44, 45 and 46 which are intended to impart the shape of the bore initiators 47a, 47b, 48a and 48b of the big end 17 and of the small end 19. The thickness of the projections 43, 44, 45 and 46 is substantially less than the depth of the bore initiators 47a, 47b, 48a and 48b (which exist prior to the sizing operation) so as to leave spaces 50, 51, 52 and 53 free, these being able to receive the excess metal. With this arrangement, the excess metal, with respect to the desired theoretical weight for the connecting rod, lies in the webs 22 and 25 intended to be removed, so that the external geometry of the sized connecting rod rough forging is not thereby affected. Thus, connecting rods are obtained which have a very high geometric and weight precision. Instead of providing differences in depth between the bore initiators and the thicknesses of the projections of the impressions in the inserts, it is possible to provide, on the projections 43, 44, 45 and 46, and along their axes, recesses (not shown) which may receive the excess metal.

Figure 8:
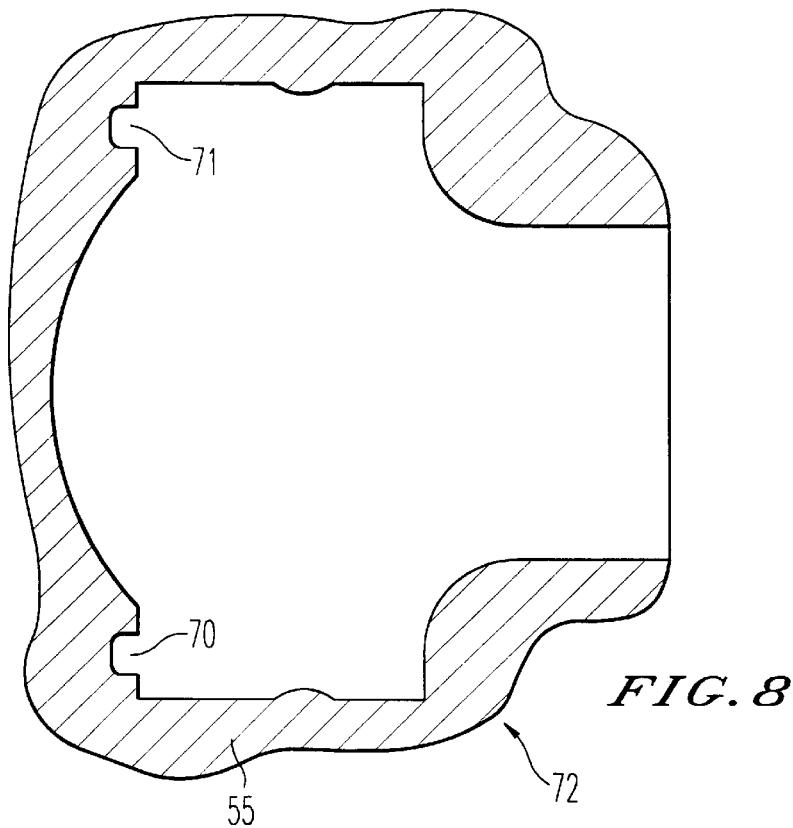
FIG. 8 is a partial view of a sizing die from above.
Figure 7:
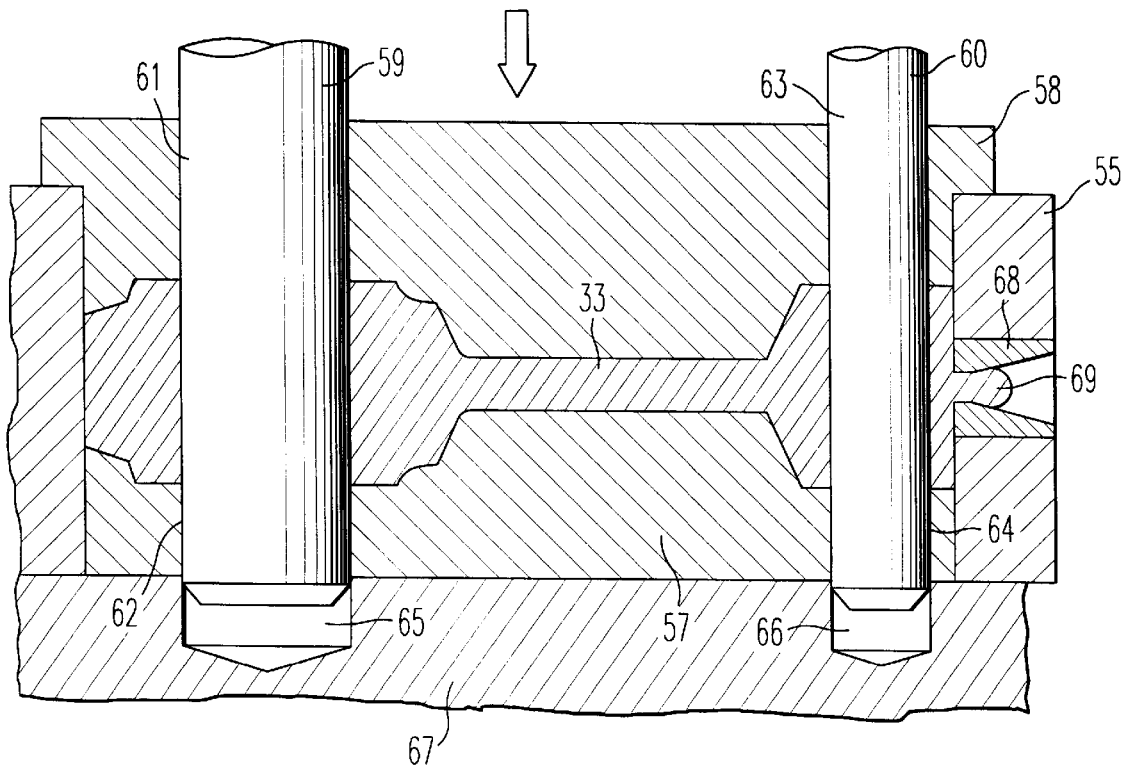
FIG. 7 is a sectional view of a content-wise sizing device, at the end of sizing, containing a sized connecting rod rough forging, the bores of which are sized.

In a second embodiment (shown in FIG. 7), the connecting rod rough forging is dewebbed before sizing, and the external geometry of the rough forging and the bores in the big end and in the small end are simultaneously sized (it would be possible, for example, to deweb only the big end and to size only the corresponding bore). The sizing of the bores is carried out by adding the mandrels 59 and 60 to the die 55 and the two inserts 57 and 58, these mandrels sliding in holes 61, 62, 63 and 64 made in the inserts 57 and 58, and, optionally, in holes 65 and 66 drilled in the support block 67 of the press. The axis and the diameter of the first mandrel 59 correspond, respectively, to the axis and to the diameter of the bore in the big end. The axis and the diameter of the second mandrel 60 correspond, respectively, to the axis and to the diameter of the bore in the small end. During sizing, the metal is clamped not only against the internal wall of the die 55 and against the impressions in the inserts 57 and 58, but also against the mandrels 59 and 60. Thus, sizing of the external part and of the bores in the sized connecting rod rough forging is obtained, however, in the absence of particular provisions, any excess metal would be unable to escape and the precision on the thickness, and therefore on the weight, would not be good. In addition, means are provided for allowing the excess metal to escape without affecting the geometry of the sized connecting rod rough forging. These means are, for example, on the side of the small end or on the side of the big end, an orifice 68 placed in the wall of the die 55. The orifice 68 is frustoconical and flared outwardly. During sizing, a small amount of flash 69 is formed in the orifice 68, this flash 69 being cut off when extracting the sized connecting rod rough forging after sizing. These means may also be small spaces 70, 71 which are left available in the part 72 of the die 55 (FIG. 8) corresponding to the big end of the connecting rod, these spaces being arranged, for example, along the axis of the holes which will be drilled in the lugs for penetration of the bolts for fixing the cap to the rest of the connecting rod. The excess metal, which will be transferred into these regions, will in any case be removed during drilling of the holes.

The sizing operations which have just been described enable the entire connecting rod rough forging to be sized. However, the sizing may be limited to only the big end, or to the big end and to the small end. The important point is that the characteristics of a precision connecting rod, which were described above, be respected, in particular the weight.

Since the sizing is carried out hot, a person skilled in the art will understand that, in order to determine the exact geometry of the tooling, it is necessary to take account of the thermal expansions and that it is preferable to ensure that, during manufacture, the temperature of the tooling remain as stable as possible.

The sizing operation is distinguished from the related forging operations especially by the fact that the flows of metal take place with little deformation, less than 10%, compared to the minimum of several tens of % for the related forging operations. It is also distinguished therefrom by the fact that it is performed without the formation of flash. Finally, it enables drafts of less than 0.5° to be obtained, compared to a minimum of 3° in respect of the rough forgings.

The plating operation has the advantage of not only giving the periphery of the connecting rod a precise geometry but also of adjusting the thickness of the big end and of the small end, and of ensuring the trueing of the connecting rod. This makes it possible, especially, to reduce, or indeed eliminate, certain machining operations.

Finally, the sizing operation makes it possible to obtain a very high quality in the regions 12 connecting the shank 3 of the connecting rod to the small end 1. This quality significantly increases the fatigue strength of the connecting rod.

The invention applies both to entirely sized connecting rods (in which the entire periphery is sized) and to connecting rods in which only certain precise regions serving as reference surfaces are sized. In particular, the shank of the connecting rod is not always completely sized. The dies and the inserts are then designed accordingly.

The connecting rods may not be separable and the cap separated from the shank of the connecting rod by machining. In this case, the bore in the big end of the connecting rod rough forging is not circular but oval (two semicircles connected by two straight segments) so as to take into account the thickness of the machining. The die, the inserts and, optionally, the corresponding mandrel then have a shape adapted accordingly.

Finally, the forging may be carried out semi-hot (after reheating to a temperature below $AC_3$). In this case, the heat treatment must then be carried out at a later stage.

The invention applies to any type of connecting rod as well as to any type of comparable forged component.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for manufacturing a forged connecting rod comprising a first end, a shank and a second end, the process comprising the steps of:

forging a connecting rod rough forging free of lateral flash and including at least one bore initiator on the first end and on the second end; and sizing the connecting rod rough forging, content-wise, by plating said connecting rod rough forging between first and second inserts inside a die in order to obtain a sized connecting rod rough forging.

2. A process as claimed in claim 1, comprising the further steps of:

fixing a relative position between the die and the first insert;

moving the second insert with respect to the die; and determining a position of the second insert at the end of sizing independently of a volume of metal of the connecting rod rough forging.

3. A process as claimed in claim 2, wherein:

the die and the first insert bear on a support block of a press and the second insert slides inside the die and includes a stop which, at the end of sizing, bears on the die so as to fix the relative position of the first and second inserts accurately.

4. A process as claimed in claim 3, wherein an assembly which comprises the die and the first and second inserts includes at least one means for receiving excess metal of the connecting rod rough forging without affecting a shape precision of the sized connecting rod rough forging.

5. A process as claimed in claim 4, wherein the at least one means for receiving excess metal of the connecting rod rough forging comprises at least one cavity which is placed either in a wall of the die, or in an impression in at least one of said first and second inserts, in regions which do not affect a geometric precision of the sized connecting rod rough forging.

6. A process as claimed in claim 4, wherein the at least one means for receiving excess metal of the connecting rod rough forging comprises at least one orifice placed in a wall of the die and opening to the outside.

7. A process as claimed in claim 1, wherein the first end is larger than the second end, the process comprising the further step of sizing at least a bore in the first end using the connecting rod rough forging from which at least a first web of the first end has been removed beforehand.

8. A process as claimed in claim 1, comprising the further step of sizing a bore in the second end using the connecting rod rough forging from which at least a second web of the second end has been removed beforehand.

9. A process as claimed in claim 8, wherein, in order to size the bore in at least one of the first end or the second end, a mandrel, which is able to slide in holes made in the first and second inserts and lying along an axis of the bore in the at least one of the first end or the second end is placed in the bore in the at least one of the first end or the second end in the connecting rod rough forging, and then the sizing is carried out.

10. A process as claimed in claim 1, comprising the further step of heat treating the sized connecting rod rough forging.

11. A process as claimed in claim 10, wherein the connecting rod is made of a steel whose chemical composition comprises, by weight, less than 10% of alloying elements, the rough forging is hot forged at a temperature above 1050° C., and the sizing is carried out while the rough forging is still hot from forging.

12. A process as claimed in claim 11, wherein the temperature at the end of sizing is above the steel's $Ar_3$ temperature and heat treatment is carried out while the sized rough forging is still hot from sizing.

13. A process as claimed in claim 12, wherein the heat treatment includes at least one controlled cooling at a cooling rate of less than 10° C./s so as to obtain a pearlitic or ferrito-pearlitic structure.

14. A process as claimed in claim 12, wherein the heat treatment includes at least one controlled cooling at a cooling rate of greater than 0.5° C./s so as to obtain a structure containing more than 60% of bainite.

15. A process as claimed in claim 12, wherein the heat treatment is a normalization operation intended to obtain a pearlitic or ferrito-pearlitic structure.

16. A process as claimed in claim 11, wherein the steel is a steel enabling a separable connecting rod to be obtained.

17. A process as claimed in claim 1, wherein the connecting rod rough forging is obtained by a drop forging of closed-die forging of a slug.

18. A process as claimed in claim 17, wherein the slug is obtained by a preshaping rolling of a billet.

\* \* \* \* \*